UNITED STATES PATENT OFFICE.

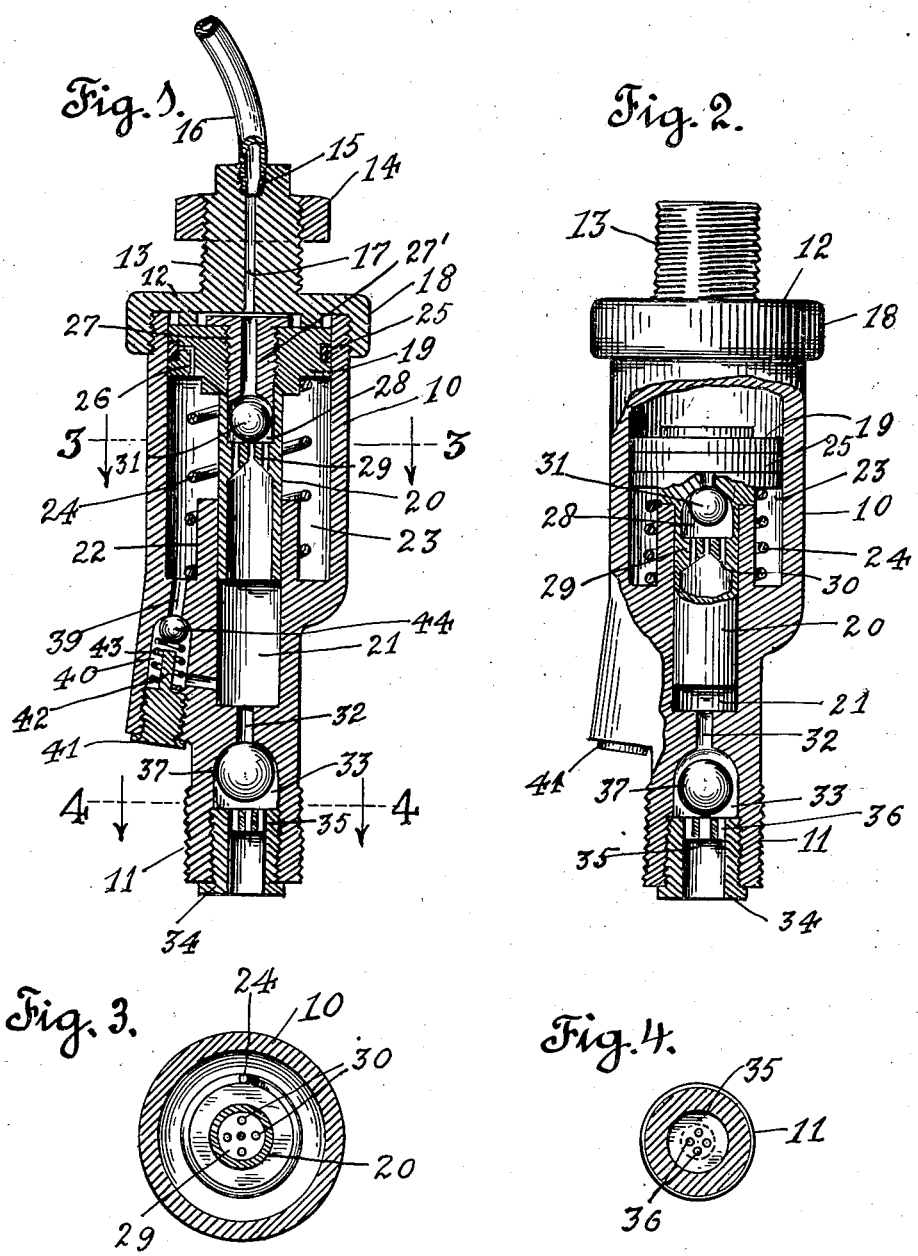

EARBY H. McCLELLAND, OF TUCSON, ARIZONA, ASSIGNOR OF ONE-HALF TO JOSEPH F. HEIMBACH, OF TUCSON, ARIZONA, AND ONE-HALF TO JOSEPH F. HEIMBACH, TRUSTEE, OF TUCSON, ARIZONA.

AUTOMATIC LUBRICATOR.

1,186,487. Specification of Letters Patent. Patented June 6, 1916.

Application filed August 31, 1915. Serial No. 48,223.

*To all whom it may concern:*

Be it known that I, EARBY H. MCCLELLAND, a citizen of the United States, residing at Tucson, in the county of Pima and State of Arizona, have invented new and useful Improvements in Automatic Lubricators, of which the following is a specification.

My invention relates to a lubricator and in particular to an automatic oil lubricator for locomotive engines.

The superheat steam engine now in common use on railroads is not supplied with oil at the right time for its valves and cylinders. This is especially true when the locomotive is working under a heavy load, especially when going up an incline and using greater quantities of steam. When the engine is worked to its maximum power with defective lubrication for any length of time the cylinders and valves will become so hot that they will cut the mirror finish off the cylinder walls, and the cylinder rings will become red hot on the outer edges. When the engine is in this condition the quantity of oil that is situated in the oil pipe under the boiler jacket, will come to a boil and the pressure in the oil pipe will become greater than the cylinder pressure and will inject oil into the hot valves and cylinders in a lump. The engine, being excessively hot from the friction, will decompose the oil forming a deposit of carbon, which will tend to grind out the cylinder walls and rings.

When the engineer shuts off the throttle when the engine is in the highly heated condition, as described, and receives a big lump of oil into the cylinders from the oil pipe, the oil may be decomposed and explode. Such explosion will often destroy the cylinder rings, and when the engine is on dead center may shoot off the crank pins or crack the cylinder head or the piston head. These engine troubles, due to imperfect lubrication, causes considerable trouble and heavy expense to the railroad companies.

It is an object of my invention to design an automatic lubricator which will positively and constantly feed the oil into the cylinders and valves of the engine. The quantity of oil may be greatly reduced amounting in some instances to one-half and even one-third of the amount of oil used by the ordinary lubricator.

My lubricator will overcome the friction heat in the steam engine due to the imperfect lubrication of the ordinary lubricator thereby reducing the pressure in the oil feed pipe as much as one-third.

My lubricator is constructed so as to be interchangeable with the small oil plugs which are in use today and may be used on any steam engine.

My lubricator is operated from the pressure in the oil pipe, and will operate when there is a pressure as low as 125 lbs., in the oil feed pipe working against a high cylinder pressure of 200 pounds.

With this and other objects in view, which will appear as the description proceeds, my invention consists in the construction and arrangement of parts hereinafter described and claimed.

In the accompanying drawings, which form a part of this specification, I have shown a convenient and practical embodiment of my invention, and in which, Figure 1, is a central vertical section of my device showing the position of the piston at the end of its upward stroke. Fig. 2, shows a similar view, with parts broken away, showing the position of the piston at the end of its downward stroke. Fig. 3, is a horizontal section on line 3—3 Fig. 1. Fig. 4, is a horizontal section on line 4—4, Fig. 1.

My lubricator consists of a cylinder casing 10 having an upper portion which is cylindrical in shape. The intermediate portion has a somewhat smaller cross section than the upper portion, and the lower portion ends in a cylindrical nipple 11, which is externally threaded and adapted to be screwed into the top wall of the steam chest of the steam engine. The upper portion of casing 10 is externally threaded at its upper end and adapted to receive in threaded engagement a flanged head 12. A cylindrical boss 13 extends upwardly from said head and is externally threaded for the reception of a nut 14, the boss having a central vertical bore 15 in which the oil pipe 16 is secured. This oil pipe is connected with the oil feed supply and the interior of the boiler as will be understood. A central vertical oil inlet port 17 in the head 12 connects the oil pipe 16 and the interior of the cylinder casing 10. A circular shoulder 18 extends downwardly from the lower side of the head 12 and in spaced relation from the wall of cylinder 10. A motor piston 19 is disposed in said cylinder and is provided at its lower end with a hollow cylindrical plunger piston 20 open at the lower end. The lower portion of the plunger piston extends for reciprocatory movement into an oil cylinder 21, the plunger piston 20, being of a size to slidably engage the walls of the oil cylinder 21. The latter is formed in the intermediate portion of the cylinder casing 10 and a boss 22 upwardly extending from the intermediate portion of the cylinder casing 10.

As clearly shown in Fig. 1, the plunger piston 20, in conjunction wth boss 22 forms with the cylinder casing 10 an annular chamber 23 which is reduced in size at its lower end.

A helical spring 24 encircling the plunger piston and engaging the bottom of the chamber 23 and the piston 19, tends to press the latter upwardly against the circular shoulder 18. In order to make a fluid tight closure between the upper part of the cylinder casing 10, and the lower part thereof, a packing ring 25 is provided on piston 19. A duct 26 leads from the chamber 23 to said packing ring. The motor piston 19 is provided with a threaded central cylindrical bore adapted for the reception of a bushing 27. The bushing has a central vertical bore constituting the intermediate graduating port 27' leading to a valve cage 28 formed by the lower end of the bushing, which is hemispherical in shape, and a horizontal partition wall 29 in the plunger piston. The latter is provided with a series of vertical bores 30. Located within said valve cage is a ball valve 31. An outlet port 32 leads from the bottom of oil cylinder 21 to a valve cage 33, which is formed by the hemispherical end wall of nipple 11, and a bushing 34 which extends in threaded engagement upwardly from the outlet of said nipple. The upper end of said bushing is provided with a bridge wall 35 provided with a series of vertical bores 36. A ball valve 37 is located in said cage.

A by-pass 39 leading from the bottom of the chamber 23 communicates with the lower end of the oil cylinder 21. A small valve chamber 40 interposed in said by-pass controls the same. A plug 41 is screwed into the lower end of said valve chamber forming a closure therefor. The upper part of said plug is provided with a stem 42 around which a helical spring 43 is coiled holding the ball valve 44 against a seat in the by-pass 39 leading from the annular chamber with yielding pressure.

It should be noted that the graduating port in the bushing 27 is of the same cross section as the outlet port 32, while the inlet port in the head 12 has a smaller cross sectional area.

Operation: On opening of the throttle of the engine, the valve 37 will close against its seat, and the oil cylinder and the interior of the plunger piston will fill with oil and steam which passes from the oil pipe through the inlet and graduating ports past the open valve 31. After the oil cylinder and the plunger piston have been filled with oil and steam, the motor piston 19 will start from its extreme upper position on its downward stroke, causing the valve 31 to close and outlet valve 37 to open, and forcing the oil from the oil cylinder into the engine cylinders. Owing to the fact that the graduating port 27' is of greater cross-sectional area than inlet port 17, the pressure above the motor piston 19 will gradually become greater than the pressure in the oil cylinder 21, thereby causing the inlet valve 31 to open. The compression spring 24 will now cause the motor piston to kick back toward the top of the cylinder casing. This sudden upward movement of the motor piston causes the valve 37 to close and the valve 31 to open filling the oil cylinder and the interior of the plunger piston with oil and steam almost immediately. The cycle of operations is repeated as before.

If any oil should leak past the packing ring 25 into the chamber 23 while the engine is drifting, the same will be sucked from the said chamber through the by-pass 39 into the engine cylinders. When the engine is drifting both the ball valves 37 and 31 will drop on their respective riding places thereby allowing oil to pass directly from the inlet port through the oil cylinder and the outlet port into the engine cylinders.

If a long stroke of the motor piston is desired the cross section of the graduating port 27' should be three times as large as the inlet port 17. If a shorter piston stroke is desired the cross section of the graduating port must be correspondingly reduced.

My automatic lubricator will cover the valve chambers and the cylinders of the engine with a uniform thin coat of oil. The friction in the cylinders will be eliminated and the carbonizing of the oil therein will be avoided. My lubricator performs the function of the high pressure lubricating pump and works automatically from the pressure in the oil pipe, receiving the oil and forcing it into the steam chamber against higher pressure.

I claim:

1. In an automatic lubricator for steam engines, the combination of a motor cylinder of relatively large bore, a reciprocatory piston therein, a pump cylinder of relatively small bore, a plunger therein and secured to said piston, resilient means within said motor cylinder holding said piston against the upper end of said motor cylinder, a spring valve controlled passage leading from the lower end of said motor cylinder to said pump cylinder, an oil inlet port in the upper head of said motor cylinder, a graduating port passing through said piston and said plunger and connecting said oil inlet with said pump cylinder, a downwardly opening valve in the upper part of said plunger, an outlet port in said pump cylinder, a downwardly opening valve controlling said outlet port, said graduating port and said outlet port being of equal size and larger than said oil inlet port.

2. In an automatic lubricator, the combination of a motor cylinder of relatively large bore, a reciprocatory motor piston therein, a plunger cylinder of relatively small bore, a plunger therein and secured to said piston, resilient means holding said piston against the upper end of said motor cylinder, an oil inlet port in the upper head of said motor cylinder, a graduating port passing through said piston and said plunger and connecting said oil inlet to said plunger cylinder, a downwardly opening valve in the upper part of said plunger cylinder, an outlet port in said plunger cylinder, and a downwardly opening valve controlling said outlet port, said graduating port and said port being of equal size and larger than said oil inlet port.

3. In an automatic lubricator, the combination of a motor cylinder of relatively large bore, a reciprocatory piston therein, a plunger cylinder of relatively small bore, a plunger therein and operatively connected to said piston, resilient means holding said piston against the upper end of said motor cylinder, an oil inlet port in the upper head of said motor cylinder, a graduating port connecting said oil inlet port with said plunger cylinder, an outlet port in said plunger cylinder, and a valve each for controlling the oil inlet and the oil outlet of said plunger cylinder respectively, said graduating port and said outlet port being larger than said oil inlet port.

In testimony whereof I have signed my name to this specification.

EARBY H. McCLELLAND.